(12) United States Patent
Takeuchi

(10) Patent No.: US 10,773,137 B2
(45) Date of Patent: Sep. 15, 2020

(54) SHAFT SET

(71) Applicant: SUMITOMO RUBBER INDUSTRIES, LTD., Kobe-shi, Hyogo (JP)

(72) Inventor: Hiroyuki Takeuchi, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 16/031,259

(22) Filed: Jul. 10, 2018

(65) Prior Publication Data

US 2019/0015719 A1 Jan. 17, 2019

(30) Foreign Application Priority Data

Jul. 11, 2017 (JP) ................................. 2017-135462

(51) Int. Cl.

| | | |
|---|---|---|
| *A63B 53/10* | (2015.01) | |
| *B29C 70/54* | (2006.01) | |
| *A63B 53/04* | (2015.01) | |
| *B29C 70/32* | (2006.01) | |
| *B29C 70/20* | (2006.01) | |
| *A63B 102/32* | (2015.01) | |
| *B29L 31/52* | (2006.01) | |
| *B29K 105/08* | (2006.01) | |
| *B29K 309/08* | (2006.01) | |
| *B29K 307/04* | (2006.01) | |
| *B29K 63/00* | (2006.01) | |
| *A63B 53/00* | (2015.01) | |

(52) U.S. Cl.
CPC ............ *A63B 53/10* (2013.01); *A63B 53/047* (2013.01); *B29C 70/202* (2013.01); *B29C 70/32* (2013.01); *B29C 70/543* (2013.01); *A63B 53/0466* (2013.01); *A63B 2053/005* (2013.01); *A63B 2102/32* (2015.10); *A63B 2209/023* (2013.01); *B29C 70/545* (2013.01); *B29K 2063/00* (2013.01); *B29K 2105/0881* (2013.01); *B29K 2307/04* (2013.01); *B29K 2309/08* (2013.01); *B29L 2031/5227* (2013.01)

(58) Field of Classification Search
CPC ...................................... A63B 53/10
USPC ......................... 473/289, 291, 287
See application file for complete search history.

(56) References Cited

U.S. PATENT DOCUMENTS

| | | | | |
|---|---|---|---|---|
| 2010/0167833 A1* | 7/2010 | Sato | ........................ | A63B 53/10 473/289 |
| 2013/0231201 A1* | 9/2013 | Matsunaga | ............ | A63B 60/00 473/319 |
| 2015/0018114 A1* | 1/2015 | Stokke | ................... | A63B 53/12 473/287 |

(Continued)

*Primary Examiner* — John E Simms, Jr.
*Assistant Examiner* — Rayshun K Peng
(74) *Attorney, Agent, or Firm* — Birch, Stewart, Kolasch & Birch, LLP

(57) ABSTRACT

A shaft set 2S includes a first shaft SF1, a second shaft SF2 shorter than the first shaft SF1, and a third shaft SF3 shorter than the second shaft SF2. At least the second shaft SF2 and the third shaft SF3 each include butt partial bias layers s3 and s4. Weights of the butt partial bias layers s3 and s4 are increased as the shaft is shortened. At least the first shaft SF1 and the second shaft SF2 each include tip partial bias layers s10 and s11. Weights of the tip partial bias layers s10 and s11 are decreased as the shaft is shortened.

11 Claims, 6 Drawing Sheets

(56) References Cited

U.S. PATENT DOCUMENTS

2016/0250528 A1 9/2016 Barksdale et al.
2016/0354647 A1* 12/2016 Nakano .................. A63B 53/10

* cited by examiner

SHAFT SET

The present application claims priority on Patent Application No. 2017-135462 filed in JAPAN on Jul. 11, 2017, the entire contents of which are hereby incorporated by reference.

BACKGROUND OF THE INVENTION

Field of the Invention

The present invention relates to a shaft set for a golf club set.

Description of the Related Art

A group of shafts having respective lengths different from each other is usually used for a golf club set. Japanese Patent Application Laid-Open No. 2016-159151 (US2016/0250528) discloses a golf club set in which the shaft weight is decreased with increase of the shaft length according to a predetermined relationship.

SUMMARY OF THE INVENTION

As a result of extensive studies by the inventor of the present application, it has been found that an improved shaft set can be obtained by a new constitution.

It is an object of the present disclosure to provide a shaft set suitable for a golf club set.

In one aspect, a shaft set is used for a golf club set. The shaft set may include a first shaft, a second shaft shorter than the first shaft, and a third shaft shorter than the second shaft. Each of the first shaft, the second shaft, and the third shaft may include a full length bias layer. At least the second shaft and the third shaft may each include a butt partial bias layer. The weight of the butt partial bias layer may be increased as the shaft is shortened. At least the first shaft and the second shaft may each include a tip partial bias layer. The weight of the tip partial bias layer may be decreased as the shaft is shortened.

In another aspect, at least the second shaft and the third shaft may each include a butt partial straight layer. The weight of the butt partial straight layer may be increased as the shaft is shortened.

The butt partial straight layer may not be present.

The butt partial straight layer may be a carbon fiber reinforced layer. The butt partial straight layer may be a glass fiber reinforced layer. The weight of the butt partial straight layer may be increased as the shaft is shortened.

In another aspect, the weight of the full length bias layer may be substantially constant.

In another aspect, a tip end width of the full length bias layer may be increased as the shaft is shortened.

The first shaft, the second shaft, and the third shaft may each have a shaft weight of less than 60 g. The first shaft, the second shaft, and the third shaft may each have a shaft torque of less than 4 degrees.

DESCRIPTION OF THE PREFERRED EMBODIMENTS

Hereinafter, preferable embodiments will be described in detail with appropriate references to the accompanying drawings.

Hereinafter, a shaft set for an iron type golf club set will be described as one embodiment of a shaft set. The shaft set may also be used for a wood type golf club set, or a hybrid type golf club set. Preferably, the shaft set is used for an iron type golf club set.

Figure 1:
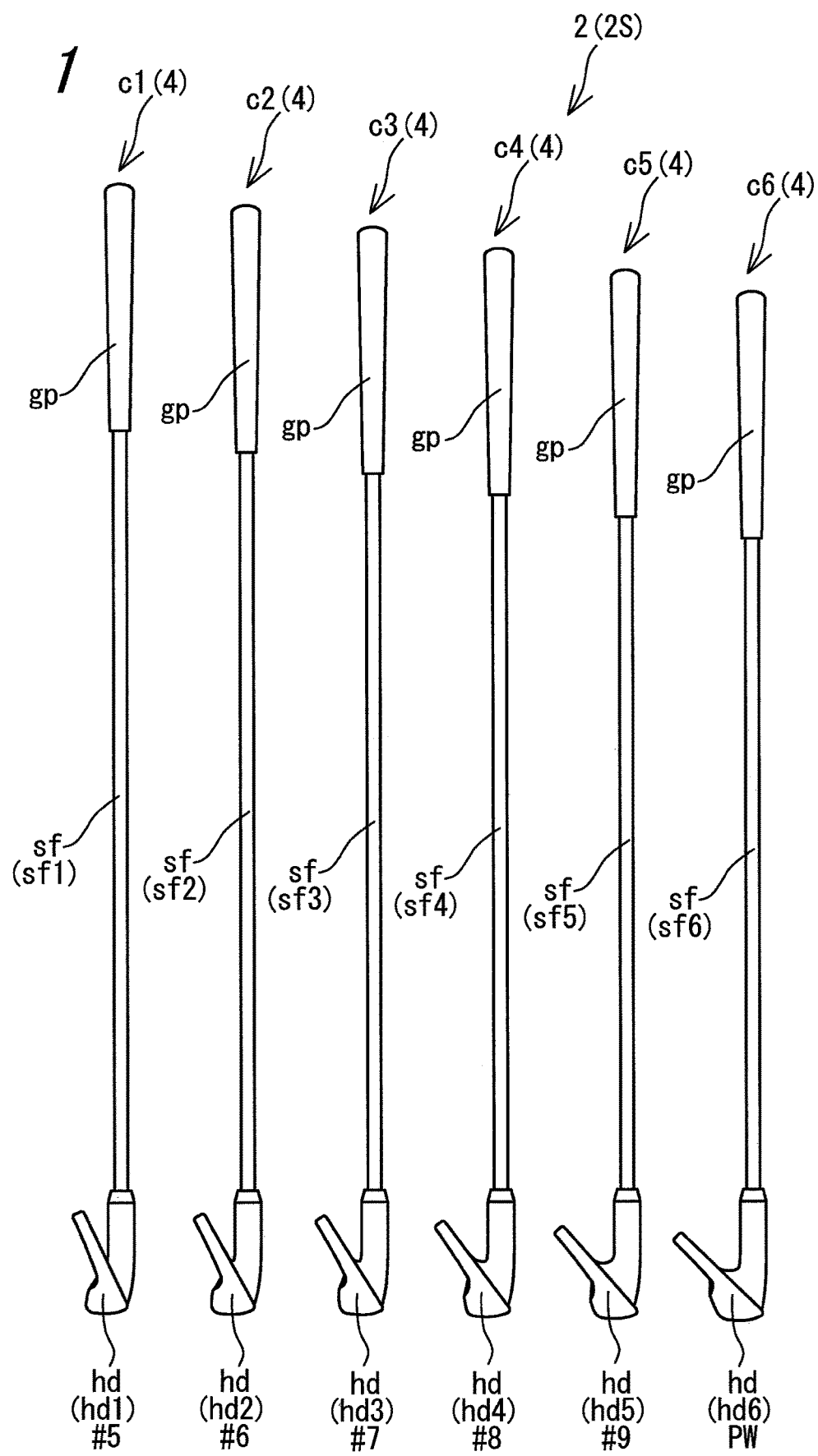
FIG. 1 shows a golf club set in which a shaft set according to one embodiment is used.
Figure 2:
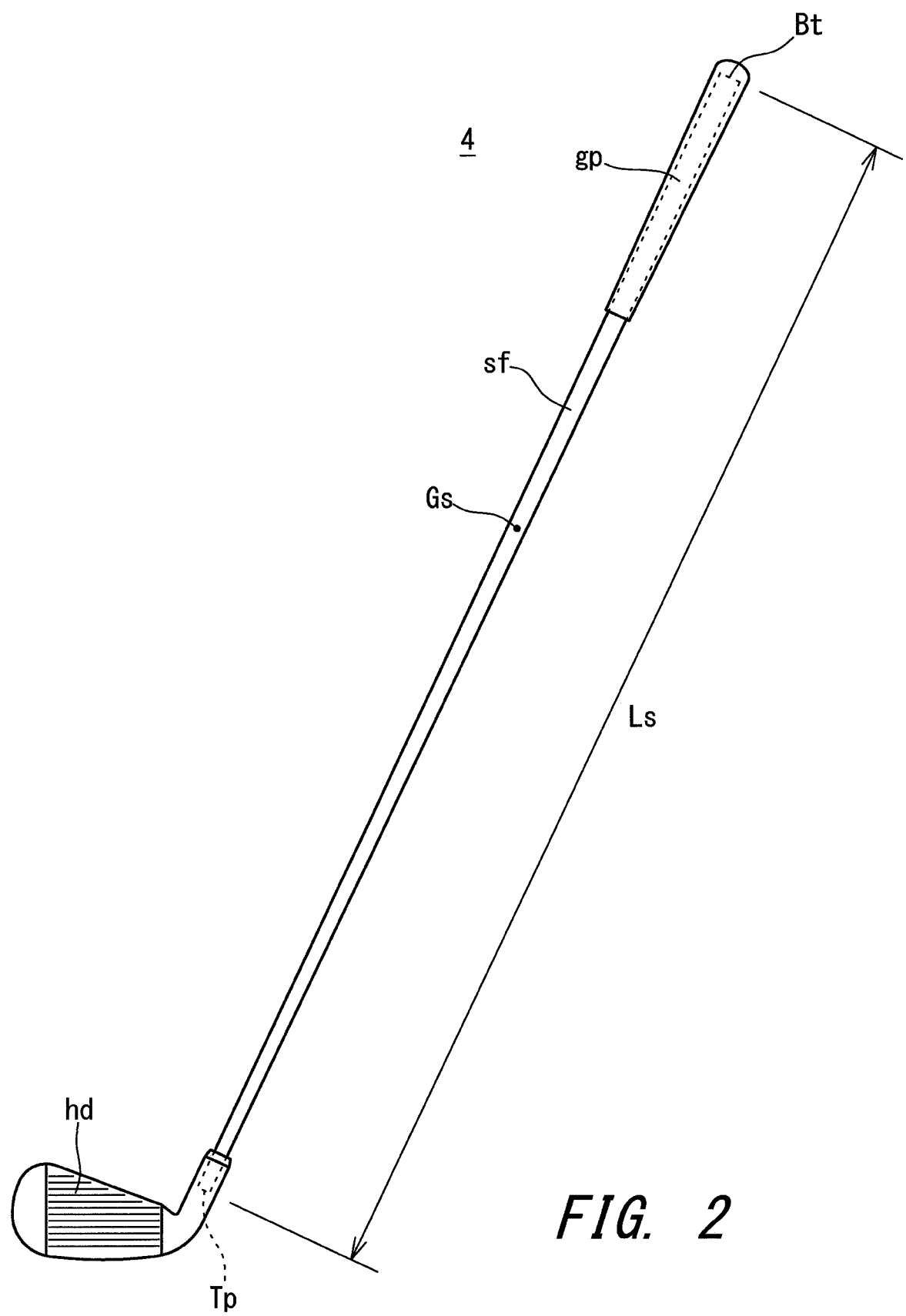
FIG. 2 shows a club included in the set of FIG. 1.

FIG. 1 shows a golf club set 2 in which a shaft set 2S according to one embodiment is used. FIG. 2 is a drawing of a golf club 4 included in the set of FIG. 1 as viewed from a hitting surface side. The set 2 is an iron type golf club set. An iron type golf club usually has a loft angle of 15 degrees or greater and 70 degrees or less. In the present application, the loft angle means a real loft angle. The real loft angle means a loft angle with respect to an axis line of the shaft.

The club set 2 includes three or more golf clubs 4 having respective loft angles different from each other. The set 2 includes three or more golf clubs 4 having respective club lengths different from each other. The set 2 includes three or more golf clubs 4 having respective club lengths and respective loft angles different from each other. In the set 2, the loft angle is increased as the club length is decreased.

In the club set 2 shown in FIG. 1, the number of the clubs is 6. The number of the clubs of the set 2 is preferably greater than or equal to 3. The number of the clubs of the club set 2 is preferably greater than or equal to 3, more preferably greater than or equal to 4, still more preferably greater than or equal to 5, and yet still more preferably greater than or equal to 6. That is, the number of shafts of the shaft set 2S is preferably greater than or equal to 3, more preferably greater than or equal to 4, still more preferably greater than or equal to 5, and yet still more preferably greater than or equal to 6. In the golf rules, the number of clubs capable of being used in play is limited. In this respect, the number of the clubs of the club set 2 is preferably less than or equal to 11, more preferably less than or equal to 10, and still more preferably less than or equal to 9. That is, the number of the shafts of the shaft set 2S is preferably less than or equal to 11, more preferably less than or equal to 10, and still more preferably less than or equal to 9.

Each of the golf clubs 4 includes a shaft sf, a head hd, and a grip gp. The head hd is attached to a tip end portion of the shaft sf. The head hd is an iron type golf club head. The grip gp is attached to a butt end portion of the shaft sf.

Each shaft sf has a tip end Tp, a butt end Bt, a shaft length Ls, and a center of gravity Gs of the shaft (see FIG. 2).

The set 2 includes clubs c1 to c6. The club c1 includes a shaft sf1, a head hd1, and a grip gp. The club c2 includes a shaft sf2, a head hd2, and a grip gp. The club c3 includes a shaft sf3, a head hd3, and a grip gp. The club c4 includes a shaft sf4, a head hd4, and a grip gp. The club c5 includes a shaft sf5, a head hd5, and a grip gp. The club c6 includes a shaft sf6, a head hd6, and a grip gp. The length of the shaft sf is decreased as the loft angle is increased.

The set 2 includes the club c1, the club c2, the club c3, the club c4, the club c5, and the club c6 in a descending order of the club length from the club having the longest club length. The club length is decreased as the loft angle is increased. In some or all of club numbers, the loft angles may be different from each other, and the club lengths may be the same.

Although not illustrated in the drawings, in the set 2, a lie angle is increased as the club length is decreased.

In the set 2, the club numbers of the respective clubs are as follows. The club c1 is a 5-iron; the club c2 is a 6-iron; the club c3 is a 7-iron; the club c4 is an 8-iron; the club c5 is a 9-iron; and the club c6 is a pitching wedge (PW). The club numbers of the golf clubs 4 included in the set 2 are not limited.

In the club set 2, the club length is decreased as the club number is increased. The loft angle is increased as the club number is increased. A difference between the loft angles of the adjacent club numbers is usually 2 degrees or greater and 6 degrees or less.

In light of the advantageous effects of the shaft set as described later, the set 2 preferably includes a first club, a second club, and a third club as follows.

[First club]: a golf club having a loft angle of 15 degrees or greater and 28 degrees or less
[Second club]: a golf club having a loft angle of greater than 28 degrees and 42 degrees or less
[Third club]: a golf club having a loft angle of greater than 42 degrees Therefore, the shaft set 2S preferably includes a shaft for the first club, a shaft for the second club, and a shaft for the third club.

In the set 2, the 5-iron is classified in the first club. In the present embodiment, the 6-iron, the 7-iron, the 8-iron and the 9-iron are classified in the second club. In the present embodiment, the pitching wedge is classified in the third club.

The shaft set 2S includes the shaft sf1, the shaft sf2, the shaft sf3, the shaft sf4, the shaft sf5 and the shaft sf6. The number of the shafts of the shaft set 2S is 6. The shaft length Ls is decreased as the club number is increased.

In the present application, the terms "first shaft", "second shaft" and "third shaft" are used. The "first", "second", and "third" are used for simply classifying shafts having respective lengths different from each other. The first shaft can preferably be used for the first club. In the embodiment of FIG. 1, the shaft sf1 is the first shaft. The second shaft can preferably be used for the second club. In the embodiment of FIG. 1, the shaft sf2, the shaft sf3, and the shaft sf4 are the second shafts. The third shaft can preferably be used for the third club. In the embodiment of FIG. 1, the shaft sf5 and the shaft sf6 are the third shafts.

Each shaft sf is a so-called carbon shaft. Preferably, the shaft sf is formed by curing a prepreg sheet. In the prepreg sheet, fibers are oriented substantially in one direction. Such a prepreg in which fibers are oriented substantially in one direction is also referred to as a UD prepreg. The term "UD" stands for unidirectional. Prepregs which are not the UD prepreg may be used. For example, fibers contained in the prepreg sheet may be woven.

The prepreg sheet has a fiber and a resin. The resin is also referred to as a matrix resin. Typically, the fiber is a carbon fiber. Typically, the matrix resin is a thermosetting resin.

The shaft sf is manufactured by a so-called sheet-winding method. In the prepreg, the matrix resin is in a semi-cured state. The shaft sf is obtained by winding and curing the prepreg sheet.

In addition to an epoxy resin, a thermosetting resin other than the epoxy resin, a thermoplastic resin, etc. can be used for the matrix resin of the prepreg sheet. In light of shaft strength, the matrix resin is preferably the epoxy resin.

Hereinafter, the structure of the shaft sf will be described in detail.

[1. Laminated Constitution of Shaft]

Figure 3:
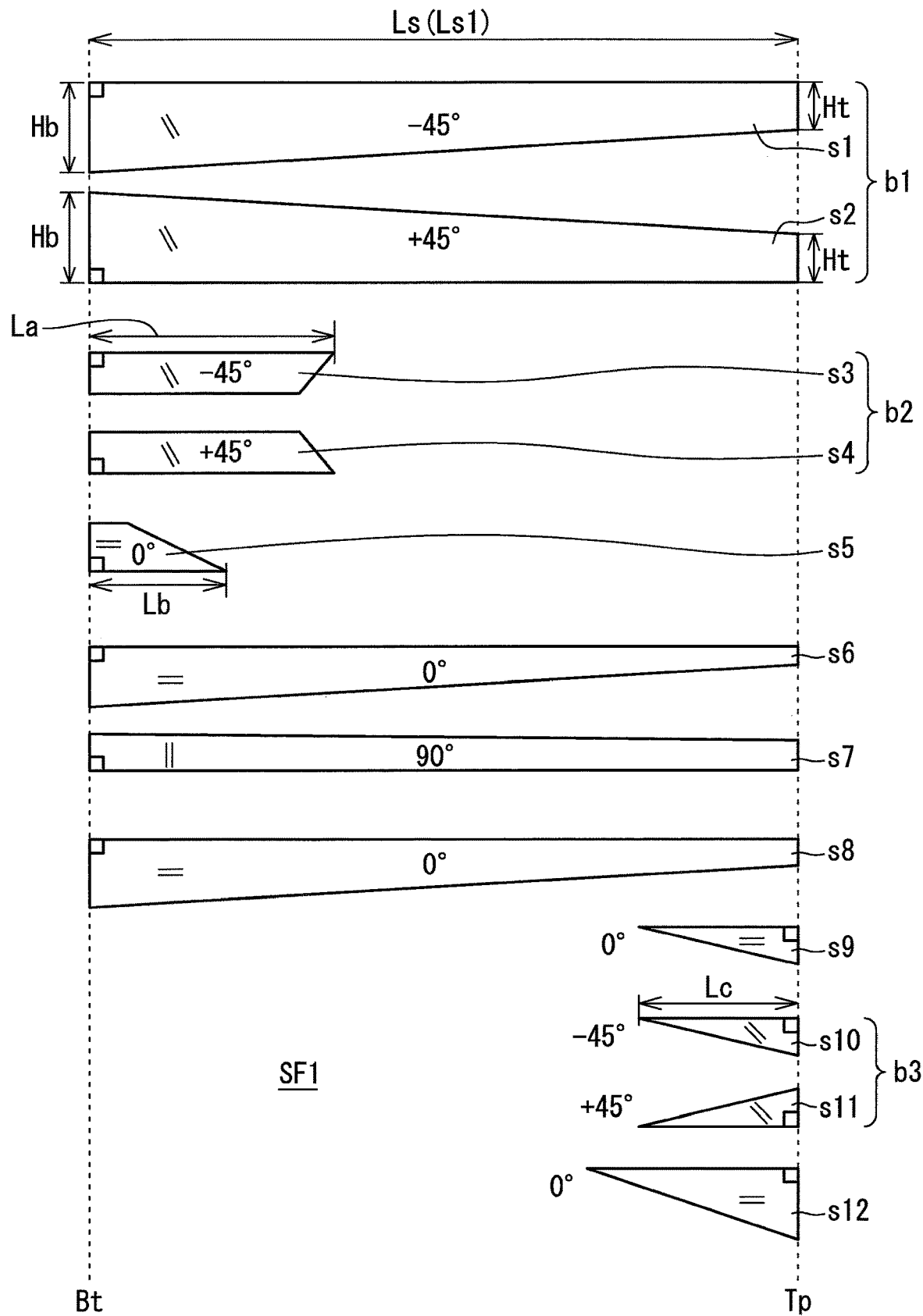
FIG. 3 is a developed view showing an example of a laminated constitution of a shaft.

FIG. 3 is a developed view (laminated constitution view) of prepreg sheets constituting the shaft sf.

The shaft sf is constituted by a plurality of sheets. The shaft sf is constituted by 12 sheets of a first sheet s1 to a twelfth sheet s12. The developed view shows the sheets constituting the shaft in order from the radial inside of the shaft. The sheets are wound in order from the sheet located on the uppermost side in the developed view. In the developed view, the horizontal direction of the figure coincides with an axial direction of the shaft. In the developed view, the right side of the figure is the tip end Tp side of the shaft. In the developed view, the left side of the figure is the butt end Bt side of the shaft.

The developed view shows not only the winding order of the sheets but also the disposal of each of the sheets in the axial direction of the shaft. For example, in FIG. 3, an end of the ninth sheet s9 is located at the tip end Tp. For example, in FIG. 3, an end of the fifth sheet s5 is located at the butt end Bt.

The term "layer" and the term "sheet" are used in the present application. The "layer" is a term for after being wound. Meanwhile, the "sheet" is a term for before being wound. The "layer" is formed by winding the "sheet". That is, the wound "sheet" forms the "layer". In the present application, the same symbol is used in the layer and the sheet. For example, a layer formed by a sheet s1 is a layer s1.

The shaft sf includes a straight layer, a bias layer, and a hoop layer. An orientation angle $\theta f$ of the fiber is described for each of the sheets in the developed views of the present application. The orientation angle $\theta f$ is an angle with respect to the axial direction the shaft.

The shaft sf includes six bias layers. These bias layers constitute three bias-layer sets. That is, the embodiment of FIG. 3 includes a first bias-layer set b1, a second bias-layer set b2, and a third bias-layer set b3.

The first bias-layer set b1 is constituted by a bias layer s1 and a bias layer s2. The fiber of the bias layer s1 and the fiber of the bias layer s2 are inclined in opposite directions to each other. The second bias-layer set b2 is constituted by a bias layer s3 and a bias layer s4. The fiber of the bias layer s3 and the fiber of the bias layer s4 are inclined in opposite directions to each other. The third bias-layer set b3 is constituted by a bias layer s10 and a bias layer s11. The fiber of the bias layer s10 and the fiber of the bias layer s11 are inclined in opposite directions to each other.

A sheet described as "0°" forms the straight layer. The sheet forming the straight layer is also referred to as a straight sheet.

The straight layer is a layer in which the angle $\theta f$ is substantially set to 0 degree. Usually, the angle $\theta f$ is not completely set to 0 degree due to error or the like in winding.

Usually, in the straight layer, an absolute angle $\theta a$ is less than or equal to 10 degrees. The absolute angle $\theta a$ is an absolute value of the orientation angle $\theta f$. For example, "the absolute angle $\theta a$ is less than or equal to 10 degrees" means that "the angle $\theta f$ is −10 degrees or greater and +10 degrees or less".

In the embodiment of FIG. 3, the straight sheets are the sheet s5, the sheet s6, the sheet s8, the sheet s9, and the sheet s12.

The bias layer is highly correlated with the torsional rigidity and torsional strength of the shaft. Preferably, bias sheets include two sheets in which orientation angles of fibers of the respective sheets are inclined in opposite directions to each other. In light of the torsional rigidity, the absolute angle θa of the bias layer is preferably greater than or equal to 15 degrees, more preferably greater than or equal to 25 degrees, and still more preferably greater than or equal to 40 degrees. In light of the torsional rigidity and flexural rigidity, the absolute angle θa of the bias layer is preferably less than or equal to 60 degrees, and more preferably less than or equal to 50 degrees.

As described above, in FIG. 3, the angle θf is described in each sheet. In the bias sheet s1 and the bias sheet s2 which constitute the first bias-layer set b1, orientation angles of fibers of the respective sheets are inclined in opposite directions to each other. The plus (+) and minus (−) in the angle θf show that the fibers of the bias sheets are inclined in opposite directions to each other. The same holds true in the second bias-layer set b2 and the third bias-layer set b3.

As shown by double slanting lines in FIG. 3, the inclination direction of the fiber of the sheet s2 is equal to the inclination direction of the fiber of the sheet s1. However, the sheet s2 is reversed, and applied on the sheet s1. As a result, the direction of the angle θf of the sheet s1 and the direction of the angle θf of the sheet s2 are opposite to each other.

The shaft sf includes a hoop layer. In the shaft sf, the hoop layer is a layer s7. In the shaft sf, the sheet forming the hoop layer is the seventh sheet s7. The sheet forming the hoop layer is also referred to as a hoop sheet. The hoop layer is preferably a carbon fiber reinforced layer.

Preferably, the absolute angle θa in the hoop layer is substantially 90 degrees to the axis line of the shaft. However, the orientation direction of the fiber to the axial direction of the shaft may not be completely set to 90 degrees due to an error or the like in winding. In the hoop layer, the angle θf is usually −90 degrees or greater and −80 degrees or less, or 80 degrees or greater and 90 degrees or less. In other words, in the hoop layer, the absolute angle θa is usually 80 degrees or greater and 90 degrees or less.

The number of plies (number of windings) of one sheet is not limited. For example, if the number of plies of the sheet is 1, the sheet is wound by one round in a circumferential direction. For example, if the number of plies of the sheet is 2, the sheet is wound by two rounds in the circumferential direction. For example, if the number of plies of the sheet is 1.5, the sheet is wound by 1.5 rounds in the circumferential direction. When the number of plies of the sheet is 1.5, the sheet forms one layer at the circumferential position of 0 to 180 degrees, and forms two layers at the circumferential position of 180 to 360 degrees.

Although not shown in the drawings, the prepreg sheet before being used is sandwiched between cover sheets. The cover sheets are usually a mold release paper and a resin film. The prepreg sheet before being used is sandwiched between the mold release paper and the resin film. The mold release paper is applied on one surface of the prepreg sheet, and the resin film is applied on the other surface of the prepreg sheet. Hereinafter, the surface on which the mold release paper is applied is also referred to as "a surface of a mold release paper side", and the surface on which the resin film is applied is also referred to as "a surface of a film side".

In the developed views of the present application, the surface of the film side is the front side. That is, in FIG. 3, the front side of the figure is the surface of the film side, and the back side of the figure is the surface of the mold release paper side.

In order to wind the prepreg sheet, the resin film is first peeled. The surface of the film side is exposed by peeling the resin film. The exposed surface has tacking property (tackiness). The tacking property is caused by the matrix resin. That is, since the matrix resin is in a semi-cured state, the tackiness is developed. The edge part of the exposed surface of the film side is also referred to as a winding start edge part. Next, the winding start edge part is applied to a wound object. The winding start edge part can be smoothly applied by the tackiness of the matrix resin. The wound object is a mandrel or a wound article obtained by winding other prepreg sheet(s) around the mandrel. Next, the mold release paper is peeled. Next, the wound object is rotated to wind the prepreg sheet around the wound object. In this way, after the resin film is peeled and the winding start edge part is applied to the wound object, the mold release paper is peeled. The procedure suppresses wrinkles and winding fault of the sheet. This is because the sheet to which the mold release paper is applied is supported by the mold release paper, and is less likely to cause wrinkles. The mold release paper has flexural rigidity higher than the flexural rigidity of the resin film.

In the embodiment of FIG. 3, some of the sheets are used as a united sheet. The bias sheets are wound in a state of the united sheet. The united sheet is formed by stacking two or more sheets. The first bias-layer set b1 is the united sheet in which the sheet s1 and the sheet s2 are united. The second bias-layer set b2 is the united sheet in which the sheet s3 and the sheet s4 are united. The third bias-layer set b3 is the united sheet in which the sheet s10 and the sheet s11 are united.

As described above, the sheets and the layers are classified by the orientation angle of the fiber. Furthermore, the sheets and the layers are classified by the axial-direction length thereof.

In the present application, a layer substantially wholly disposed in the axial direction is referred to as a full length layer. In the present application, a sheet substantially wholly disposed in the axial direction is referred to as a full length sheet. The wound full length sheet forms the full length layer.

A point separated by 20 mm from the tip end Tp in the axial direction is defined as Tp1, and a region between the tip end Tp and the point Tp1 is defined as a first region. A point separated by 100 mm from the butt end Bt in the axial direction is defined as Bt1, and a region between the butt end Bt and the point Bt1 is defined as a second region. The first region and the second region have a limited influence on the performance of the shaft. In this respect, the full length sheet may not be present either in the first region or in the second region. Preferably, the full length sheet extends from the tip end Tp to the butt end Bt. In other words, the full length sheet is preferably wholly disposed in the axial direction of the shaft.

In the present application, a layer partially disposed in the axial direction of the shaft is referred to as a partial layer. In the present application, a sheet partially disposed in the axial direction of the shaft is referred to as a partial sheet. The wound partial sheet forms the partial layer. The axial-direction length of the partial sheet is shorter than the axial-direction length of the full length sheet. Preferably, the axial-direction length of the partial sheet is less than or equal to half the full length of the shaft.

In the present application, the full length layer which is the straight layer is referred to as a full length straight layer. In the embodiment of FIG. 3, the full length straight layers are a layer s6 and a layer s8. The full length straight sheets are the sheet s6 and the sheet s8. The full length straight layer is preferably a carbon fiber reinforced layer.

In the present application, the full length layer which is the bias layer is referred to as a full length bias layer. In the embodiment of FIG. 3, the full length bias layers are the layer s1 and the layer s2. The full length bias layer is preferably a carbon fiber reinforced layer.

In the present application, the full length layer which is the hoop layer is referred to as a full length hoop layer. In the embodiment of FIG. 3, the full length hoop layer is the layer s7.

In the present application, the partial layer which is the straight layer is referred to as a partial straight layer. In the embodiment of FIG. 3, the partial straight layers are a layer s5, a layer s9, and a layer s12.

In the present application, the partial layer which is the bias layer is referred to as a partial bias layer. In the embodiment of FIG. 3, the partial bias layers are the layer s3, the layer s4, the layer s10, and the layer s11.

The term "butt partial layer" is used in the present application. Examples of the butt partial layer include a butt partial straight layer. In the embodiment of FIG. 3, the butt partial straight layer is the layer s5. The butt partial straight layer s5 may not be present.

Other examples of the butt partial layer include a butt partial bias layer. In the embodiment of FIG. 3, the butt partial bias layers are the layer s3 and the layer s4. As described above, the layer s3 and the layer s4 constitute the second bias-layer set b2. The butt partial bias layer is preferably a carbon fiber reinforced layer.

An axial-direction distance between the butt partial layer (butt partial sheet) and the butt end Bt is preferably less than or equal to 100 mm, more preferably less than or equal to 50 mm, and still more preferably 0 mm. In the present embodiment, this distance is 0 mm in all the butt partial layers.

The term "tip partial layer" is used in the present application. Examples of the tip partial layer include a tip partial straight layer and a tip partial bias layer. In the embodiment of FIG. 3, the tip partial straight layers are the layer s9 and the layer s12. The tip partial bias layers are the layer s10 and the layer s11. As described above, the layer s10 and the layer s11 constitute the third bias-layer set b3. The tip partial bias layer is preferably a carbon fiber reinforced layer.

An axial-direction distance between the tip partial layer (tip partial sheet) and the tip end Tp is preferably less than or equal to 40 mm, more preferably less than or equal to 30 mm, still more preferably less than or equal to 20 mm, and yet still more preferably 0 mm. In the present embodiment, this distance is 0 mm in all the tip partial layers.

[2. Outline of Manufacturing Process of Shaft]

The outline of the manufacturing process of the shaft is as follows.

(1) Cutting Process

The prepreg sheet is cut into a desired shape in the cutting process. Each of the sheets shown in FIG. 3 is cut out by the process.

The cutting may be performed by a cutting machine. The cutting may be manually performed. In the manual case, for example, a cutter knife is used.

(2) Stacking Process

In the stacking process, the united sheets described above are produced.

In the stacking process, heating or a press may be used. More preferably, the heating and the press are used in combination. In a winding process to be described later, the deviation of the sheet may be generated during the winding operation of the united sheet. The deviation reduces winding accuracy. The heating and the press improve an adhesive force between the sheets. The heating and the press suppress the deviation between the sheets in the winding process.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheet is wound around the mandrel. The tacking resin facilitates the application of the end part of the sheet to the mandrel.

The sheets are wound in order described in the developed view. The sheet located on a more upper side in the developed view is earlier wound. The sheets to be stacked are wound in a state of the united sheet.

A winding body is obtained in the winding process. The winding body is obtained by winding the prepreg sheets around the outside of the mandrel. For example, the winding is achieved by rolling the wound object on a plane. The winding may be performed by a manual operation or a machine. The machine is referred to as a rolling machine.

(4) Tape Wrapping Process

A tape is wrapped around the outer peripheral surface of the winding body in the tape wrapping process. The tape is also referred to as a wrapping tape. The tape is wrapped while tension is applied to the tape. A pressure is applied to the winding body by the wrapping tape. The pressure reduces voids.

(5) Curing Process

In the curing process, the winding body after performing the tape wrapping is heated. The heating cures the matrix resin. In the curing process, the matrix resin fluidizes temporarily. The fluidization of the matrix resin can discharge air between the sheets or in the sheet. The pressure (fastening force) of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The process of removing the wrapping tape is preferably performed after the process of extracting the mandrel in light of improving the efficiency of the process of removing the wrapping tape.

(7) Process of Cutting Both Ends

Both the end parts of the cured laminate are cut in the process. The cutting flattens the end face of the tip end Tp and the end face of the butt end Bt.

In order to facilitate the understanding, in the developed views of the present application, the sheets having dimensions in which both the ends are cut are shown. In fact, the cutting of both the ends is considered in the size in cutting. That is, in fact, the cutting is performed in a state where the sizes of both end portions to be cut are added.

(8) Polishing Process

The surface of the cured laminate is polished in the process. Spiral unevenness is present on the surface of the cured laminate. The unevenness is the trace of the wrapping tape. The polishing extinguishes the unevenness to smooth the surface of the cured laminate. Preferably, whole polishing and tip partial polishing are conducted in the polishing process.

(9) Coating Process

The cured laminate after the polishing process is subjected to coating.

The shaft sf is obtained by the processes.

[3. Laminated Constitutions of Shaft Set]

Figure 4:
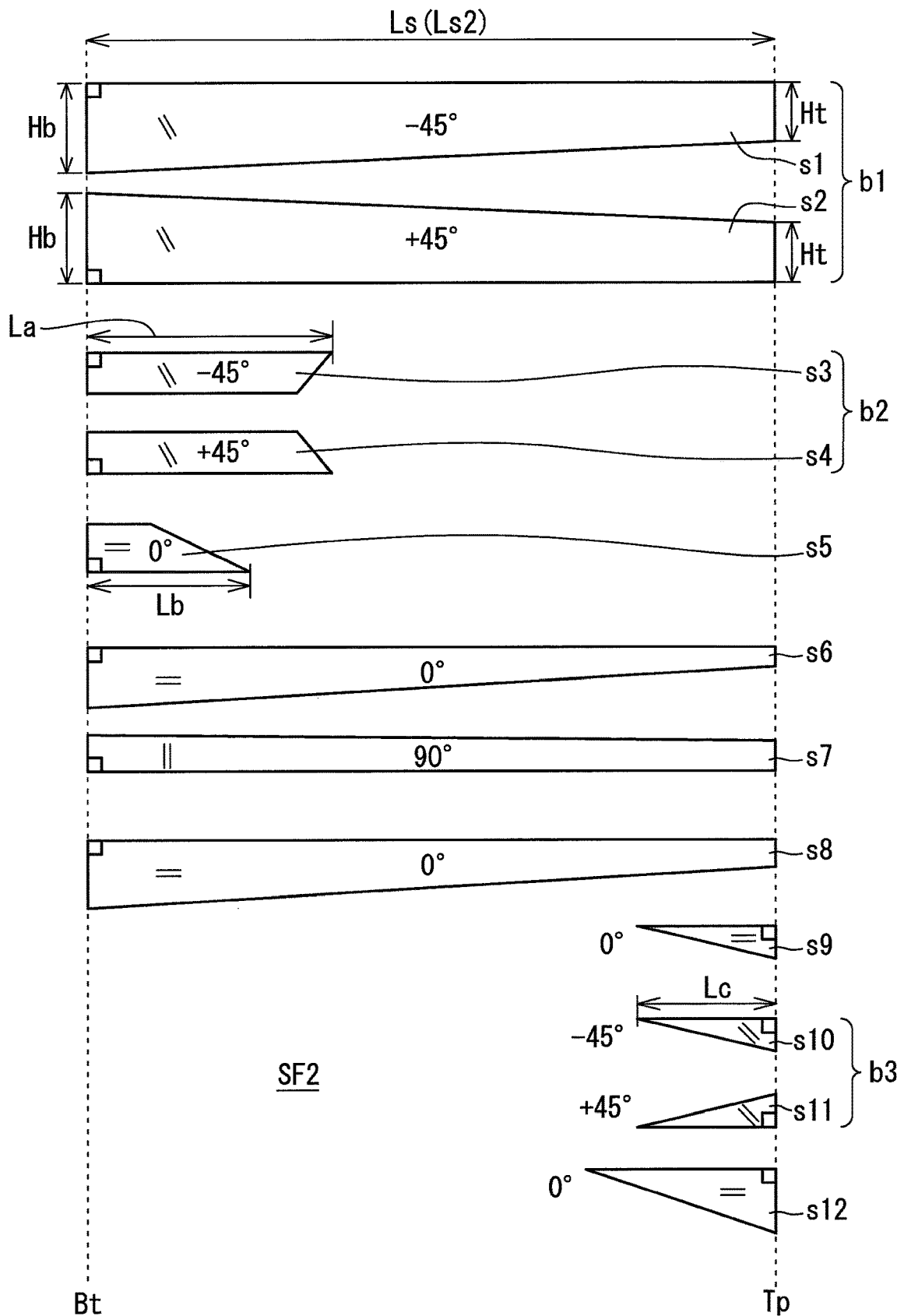
FIG. 4 is a developed view showing another example of a laminated constitution of a shaft.
Figure 5:
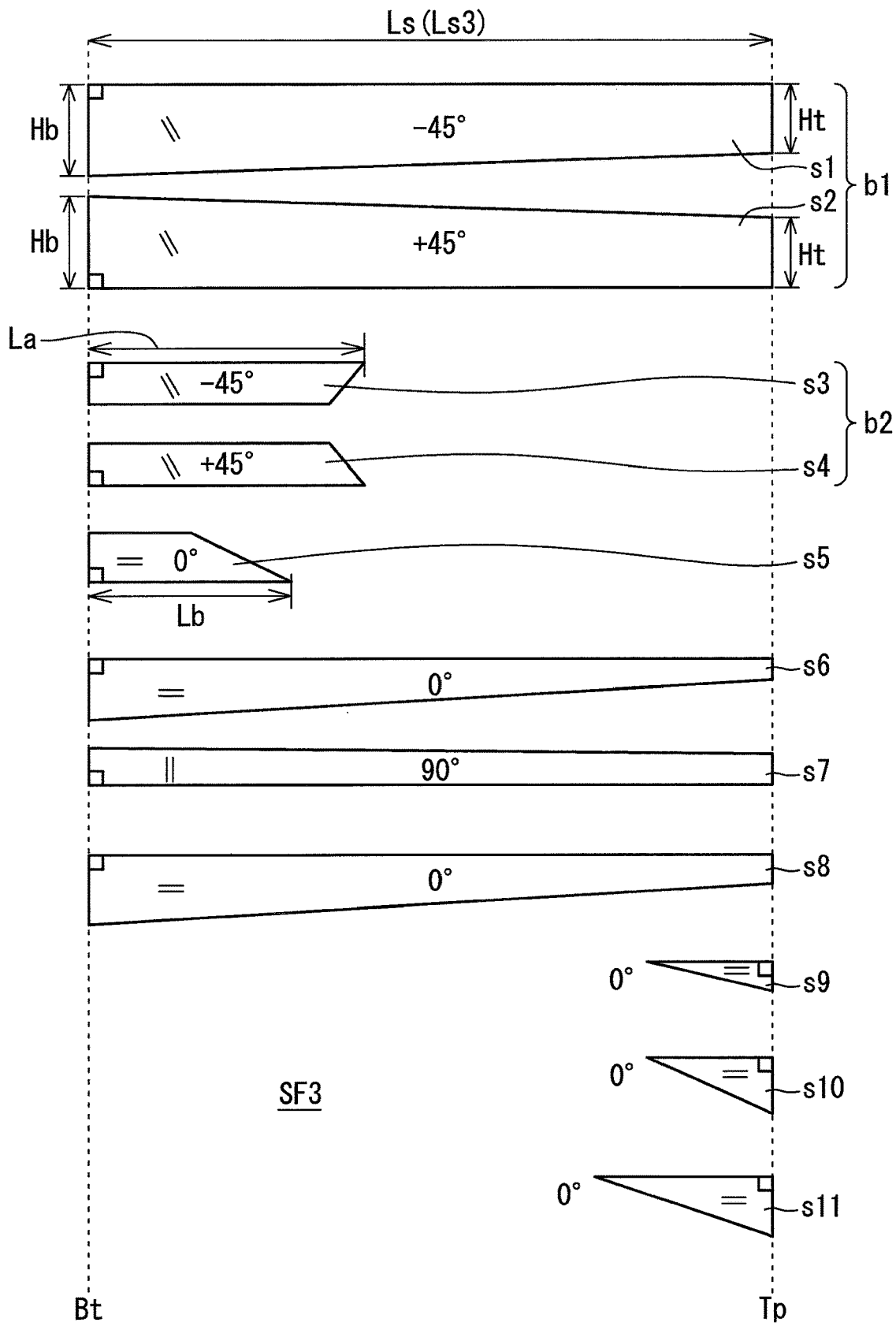
FIG. 5 is a developed view showing another example of a laminated constitution of a shaft.

FIG. 4 and FIG. 5 show respective laminated constitutions different from that of FIG. 3. Laminated constitutions of three types of the shafts SF1, SF2 and SF3 constituting the shaft set 2S are shown in FIG. 3, FIG. 4 and FIG. 5, respectively.

[3-1. First Shaft SF1 (FIG. 3)]

FIG. 3 shows an example of the constitution of the first shaft SF1. The constitution of the shaft SF1 in FIG. 3 is as described above.

[3-2. Second Shaft SF2 (FIG. 4)]

FIG. 4 shows an example of the constitution of the second shaft SF2.

The constitution of the shaft SF2 in FIG. 4 is the same as that of the shaft SF1 in FIG. 3 except for the following items.
(a) shaft length Ls
(b) weight Wa of the butt partial bias layers s3 and s4
(c) weight Wb of the butt partial straight layer s5
(d) weight Wc of the tip partial bias layers S10 and s11
(e) shapes of the full length bias layers s1 and s2

The weight Wa is the sum of the weight of the layer s3 and the weight of the layer s4. The weight Wc is the sum of the weight of the layer s10 and the weight of the layer s11.

As to the above (a), the shaft length Ls2 of the second shaft SF2 is shorter than the shaft length Ls1 of the first shaft SF1. That is, Ls2<Ls1.

As to the above (b), the weight Wa2 in the second shaft SF2 is greater than the weight Wa1 in the first shaft SF1. That is, Wa2>Wa1.

As to the above (c), the weight Wb2 in the second shaft SF2 is greater than the weight Wb1 in the first shaft SF1. That is, Wb2>Wb1.

As to the above (d), the weight Wc2 in the second shaft SF2 is smaller than the weight Wc1 in the first shaft SF1. That is, Wc2<Wc1.

[3-3. Third Shaft SF3 (FIG. 5)]

FIG. 5 shows an example of the constitution of the third shaft SF3.

The constitution of the shaft SF3 in FIG. 5 is the same as that of the shaft SF2 in FIG. 4 except for the following items.
(a) shaft length Ls
(b) weight Wa of the butt partial bias layers s3 and s4
(c) weight Wb of the butt partial straight layer s5
(d) weight Wc of the tip partial bias layer
(e) shapes of the full length bias layers s1 and s2

As to the above (a), the shaft length Ls3 of the third shaft SF3 is shorter than the shaft length Ls2 of the second shaft SF2. That is, Ls3<Ls2.

As to the above (b), the weight Wa3 in the third shaft SF3 is greater than the weight Wa2 in the second shaft SF2. That is, Wa3>Wa2.

As to the above (c), the weight Wb3 in the third shaft SF3 is greater than the weight Wb2 in the second shaft SF2. That is, Wb3>Wb2.

As to the above (d), the weight Wc3 in the third shaft SF3 is smaller than the weight Wc2 in the second shaft SF2. That is, Wc3<Wc2.

In the third shaft SF3, the tip partial bias layer is not provided. That is, the Wc3 is zero.

[4. Specifications of Shaft Set]

Specifications of the shaft set 2S including the first shaft SF1, the second shaft SF2, and the third shaft SF3 are as follows.

[4-1. Variation in Shaft Length Ls]

The shaft length Ls is decreased as the club number is increased. The shaft length Ls is decreased as the loft angle of the club is increased. The length Ls2 of the second shaft SF2 is shorter than the length Ls1 of the first shaft SF1. The length Ls3 of the third shaft SF3 is shorter than the length Ls2 of the second shaft SF2. As to the shaft length Ls, the following relationship is satisfied.

Ls1> Ls2>Ls3

[4-2. Variation in Weight Wa of Butt Partial Bias Layer]

The weight Wa of the butt partial bias layer is increased as the club number is increased. The weight Wa of the butt partial bias layer is increased as the shaft length Ls is decreased. The weight Wa2 in the second shaft SF2 is greater than the weight Wa1 in the first shaft SF1. The weight Wa3 in the third shaft SF3 is greater than the weight Wa2 in the second shaft SF2. As to the weight Wa, the following relationship (variation A) is satisfied. The Wa1 may be zero.

[Variation A]: Wa1<Wa2<Wa3

Preferably, the variation A is also satisfied among their fiber weights. The fiber weight Waf of the butt partial bias layer is increased as the shaft length Ls is decreased. The fiber weight Waf2 in the second shaft SF2 is greater than the fiber weight Waf1 in the first shaft SF1. The fiber weight Waf3 in the third shaft SF3 is greater than the fiber weight Waf2 in the second shaft SF2. In the first shaft, the second shaft, and the third shaft, the kinds of the fibers used for the respective butt partial bias layers pertaining to the variation A are preferably the same.

The Wa1 may be zero. That is, the first shaft SF1 may not include the butt partial bias layer. Even when the Wa1 is zero, the variation A can be attained.

The method of changing the weight Wa of the butt partial bias layer is not limited. Examples of the method include a method of changing the area of the butt partial bias layer, and a method of changing a prepreg weight per unit area of the butt partial bias layer. Examples of the former method include a method of changing the number of windings of the butt partial bias layer, and a method of changing an axial-direction length La (see FIGS. 3 to 5) of the butt partial bias layer.

In the present embodiment, prepreg weights per unit area of the butt partial bias layers s3 and s4 of the first shaft SF1 are different from those of the second shaft SF2. The length La in the second shaft SF2 differs from the length La in the third shaft SF3 (see FIG. 4 and FIG. 5).

[4-3. Variation in Weight Wb]

As described above, the butt partial straight layer may not be present. In the present embodiment, the first shaft SF1, the second shaft SF2 and the third shaft SF3 each include the butt partial straight layer. In addition, the weight Wb of the butt partial straight layer is increased as the club number is increased. The weight Wb of the butt partial straight layer is increased as the shaft length Ls is decreased. The weight Wb2 in the second shaft SF2 is greater than the weight Wb1 in the first shaft SF1. The weight Wb3 in the third shaft SF3 is greater than the weight Wb2 in the second shaft SF2. As to the weight Wb, the following relationship (variation B) is satisfied. The Wb1 may be zero.

[Variation B]: Wb1<Wb2<Wb3

Preferably, the variation B is also satisfied among their fiber weights. The fiber weight Wbf of the butt partial straight layer is increased as the shaft length Ls is decreased. The fiber weight Wbf2 in the second shaft SF2 is greater than the fiber weight Wbf1 in the first shaft SF1. The fiber weight Wbf3 in the third shaft SF3 is greater than the fiber weight Wbf2 in the second shaft SF2. In the first shaft, the second shaft, and the third shaft, the kinds of the fibers used for the respective butt partial straight layers pertaining to the variation B are preferably the same.

The Wb1 may be zero. That is, the first shaft SF1 may not have the butt partial straight layer. Even when the Wb1 is zero, the variation B can be attained.

The method of changing the weight Wb of the butt partial straight layer is not limited. Examples of the method include a method of changing the area of the butt partial straight layer, and a method of changing a prepreg weight per unit area of the butt partial straight layer. Examples of the former method include a method of changing the number of windings of the butt partial straight layer, and a method of changing an axial-direction length Lb (see FIGS. 3 to 5) of the butt partial straight layer.

In the present embodiment, the length Lb in the first shaft SF1 differs from the length Lb in the second shaft SF2, and the length Lb in the second shaft SF2 also differs from the length Lb in the third shaft SF3 (see FIGS. 3 to 5). The length Lb is increased as the shaft length Ls is decreased.

[4-4. Variation in Weight Wc]

The weight Wc of the tip partial bias layer is decreased as the club number is increased. The weight Wc of the tip partial bias layer is decreased as the shaft length Ls is decreased. The weight Wc2 in the second shaft SF2 is smaller than the weight Wc1 in the first shaft SF1. The weight Wc3 in the third shaft SF3 is smaller than the weight Wc2 in the second shaft SF2. As to the weight Wc, the following relationship (variation C) is satisfied. The weight Wc3 may be zero. In the present embodiment, the Wc3 in the third shaft SF3 is zero.

[Variation C]: Wc1> Wc2>Wc3

Preferably, the variation C is also satisfied among their fiber weights. The fiber weight Wcf of the tip partial bias layer is decreased as the shaft length Ls is decreased. The fiber weight Wcf2 in the second shaft SF2 is smaller than the fiber weight Wcf1 in the first shaft SF1. The fiber weight Wcf3 in the third shaft SF3 is smaller than the fiber weight Wcf2 in the second shaft SF2. In the first shaft, the second shaft, and the third shaft, the kinds of the fibers used for the respective tip partial bias layers pertaining to the variation C are preferably the same.

The Wc3 may be zero. That is, the third shaft SF3 may not include the tip partial bias layer. Even when the Wc3 is zero, the variation C can be attained.

The method of changing the weight Wc of the tip partial bias layer is not limited. Examples of the method include a method of changing the area of the tip partial bias layer, and a method of changing a prepreg weight per unit area of the tip partial bias layer. Examples of the former method include a method of changing the number of windings of the tip partial bias layer, and a method of changing an axial-direction length Lc (see FIGS. 3 and 4) of the tip partial bias layer.

In the present embodiment, the length Lc in the first shaft SF1 differs from the length Lc in the second shaft SF2. The tip partial bias layer is not provided in the third shaft SF3, and the Wc3 is zero.

[4-5. Weight Wd of Full Length Bias Layer]

The weight Wd of the full length bias layer is substantially constant regardless of the club number. The weight Wd of the full length bias layer is substantially constant regardless of the shaft length Ls. The term "substantially constant" means that the maximum value of the Wd is less than or equal to 1.10 times the minimum value of the Wd. The maximum value of the Wd is preferably less than or equal to 1.05 times the minimum value of the Wd.

In a conventional shaft set, the full length bias layers have constant shapes, and tip end widths Ht thereof are also constant. In this case, the weight Wd of the full length bias layers s1 and s2 is decreased as the shaft length Ls is decreased.

In the present embodiment, the tip end width Ht is not constant. The tip end width Ht in the first shaft SF1 differs from the tip end width Ht in the second shaft SF2, and the tip end width Ht in the second shaft SF2 also differs from the tip end width Ht in the third shaft SF3 (see FIGS. 3 to 5). The tip end width Ht is increased as the shaft length Ls is decreased. As a result, although the shaft length Ls is changed, the weight Wd is adjusted to fall within the range of substantially constant.

Butt end widths Hb in the first shaft SF1, the second shaft SF2, and the third shaft SF3 are constant. A ratio (Ht/Hb) is increased as the shaft length Ls is decreased.

[4-6. Shaft Wight]

In the shaft set 2S, the shaft weights are substantially constant. The substantially constant shaft weights enhance uniformity in the club set 2 and decrease differences between feelings of the shafts. Therefore, easiness of swing is improved as the whole club set 2. The term "substantially constant" means the maximum value of the shaft weight is less than or equal to 1.10 times the minimum value of the shaft weight. The maximum value of the shaft weight is preferably less than or equal to 1.05 times the minimum value of the shaft weight.

[5. Advantageous Effects]

The above-described specifications of the shaft set 2S exhibit the following advantageous effects.

[5-1. Tip Partial Bias Layer and Butt Partial Bias Layer]

By unevenly distributing the bias layer only to the tip portion and the butt portion, a shaft torque can be effectively decreased while suppressing the whole weight of the bias layers. As a result, a shaft which is lightweight, easy to swing, and excellent in directional stability of a hit ball is obtained.

In light of decreasing the shaft torque, the bias layer is preferably disposed on the tip portion. Hit feeling is apt to be influenced by the butt partial bias layer located close to the grip (golfer's hands). Controllability is apt to be influenced by the tip partial bias layer located close to the head, and the butt partial bias layer located close to the grip. The bias layer is unevenly distributed only to the tip portion and the butt portion to appropriately adjust each weight thereof, thereby facilitating appropriate adjustments of the shaft torque, the center of gravity of the shaft, controllability, hit feeling, etc., while suppressing the weight of the bias layer. Changing the distribution ratio of the bias layer of the tip portion to that of the butt portion enables slight adjustments of the shaft torque, the center of gravity of the shaft, controllability, hit feeling, etc. Therefore, uniformity of shaft feelings of the respective club numbers is enhanced, and differences in shots by different club numbers are suppressed.

[5-2. Variation A and Variation C]

By the combination of the variation A (Wa1<Wa2<Wa3) and the variation C (Wc1> Wc2>Wc3), the shaft weight and the shaft torque can be effectively suppressed while keeping the shaft torque substantially constant. Since the variation in the total weight of the partial bias layers is suppressed by offsetting the weight Wa with the weight Wc, the differences between shaft feelings of the respective club numbers are suppressed. The suppression of the variation in the total weight of the partial bias layers also contributes to keeping the shaft weight substantially constant.

[5-3. Variation B]

The variation B (Wb1<Wb2<Wb3) further facilitates the adjustments of the above-described properties of each shaft by the synergistic effect of the variation A and the variation B. Particularly, the butt partial straight layer is located close to the grip, and thus is useful for adjusting hit feeling. The variation B can suppress differences between hit feelings of the respective club numbers. The variation B also contributes to keeping the shaft weight substantially constant.

[5-4. Constantness of Wight Wd of Full Length Bias Layer]

In a usual shaft set, the weight Wd is decreased as the shaft length Ls is decreased. Uniformity of shaft feelings is enhanced by keeping the weight Wd substantially constant.

[5-5. Variation in Wight We of Tip Partial Glass Fiber Reinforced Layer s9]

In each of the embodiments of FIGS. 3 to 5, the tip partial straight layer s9 is provided. The layer s9 is a glass fiber reinforced layer. The weight We of the tip partial glass fiber reinforced layer s9 is decreased as the shaft is shortened. This variation contributes to uniformity of shaft feelings.

[6. Preferable Specifications]

The following specifications are preferable in the shaft set 2S.

[6-1. Shaft Weight]

In light of easiness of swing, the weight of each shaft constituting the shaft set 2S is preferably less than 60 g, more preferably less than or equal to 58 g, still more preferably less than or equal to 56 g, and yet still more preferably less than or equal to 54 g. In light of the degree of freedom in design, the shaft weight is preferably greater than or equal to 40 g, more preferably greater than or equal to 42 g, and still more preferably greater than or equal to 44 g. In light of the uniformity of shaft feelings, the shaft weight is preferably substantially constant in the shaft set 2S.

[6-2. Shaft Length Ls]

As described above, the shaft set 2S is preferably used for an iron type golf club set. In other words, the shaft set 2S is preferably an iron type shaft set. In this respect, the shaft length Ls is preferably shorter than or equal to 991 mm and longer than or equal to 860 mm.

In view of respective club lengths of an iron set, the shaft length Ls3 of the third shaft SF3 is preferably longer than or equal to 860 mm and shorter than 885 mm. The shaft length Ls2 of the second shaft SF2 is preferably longer than or equal to 885 mm and shorter than 928 mm. The shaft length Ls1 of the first shaft SF1 is longer than or equal to 928 mm and shorter than or equal to 991 mm.

[6-3. Shaft Torque]

In light of directional stability of a hit ball, the shaft torque of the shaft sf is preferably less than 4 degrees, more preferably less than or equal to 3.9 degrees, and still more preferably less than or equal to 3.8 degrees. The shaft torque can be effectively decreased by the above-described constitution although the shaft is lightweight. In view of properties of materials commercially available at present, the shaft torque is preferably greater than or equal to 2.0 degrees, and more preferably greater than or equal to 2.5 degrees.

[6-4. Fiber of Butt Partial Straight Layer]

Examples of the fiber of the butt partial straight layer include a carbon fiber and a glass fiber. In light of enhancing the uniformity of hit feelings brought by the variation B, the butt partial straight layer is preferably a glass fiber reinforced layer. Since the glass fiber has a specific gravity greater than that of the carbon fiber, this glass fiber reinforced layer disposed on the butt portion also contributes to adjustment of the center of gravity of the shaft.

[6-5. Fiber of Tip Partial Straight Layer]

Each of the embodiments of FIGS. 3 to 5 includes the tip partial straight layer s9. The layer s9 is a tip partial straight layer which is not the outermost layer. The tip partial straight layer s9 is preferably a glass fiber reinforced layer. Behavior of the shaft during swinging can be stabilized by disposing the glass fiber reinforced layer having a large specific gravity on the tip portion and the butt portion. The weight of the tip partial straight layer is decreased as the shaft length Ls is decreased.

[7. Method for Measuring Shaft Torque]

Figure 6:
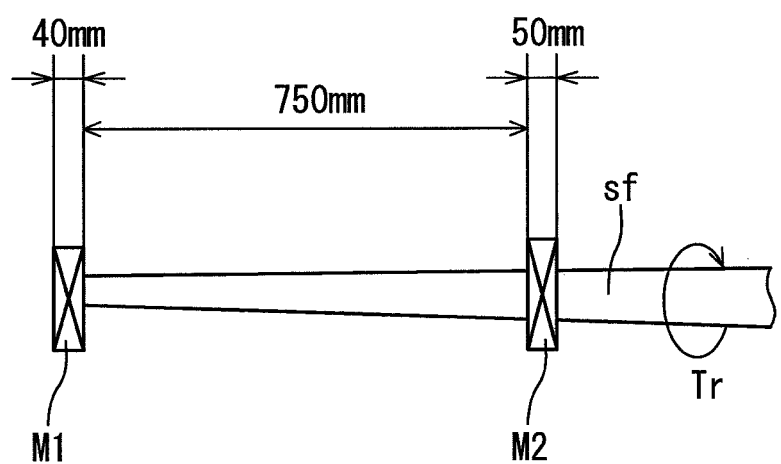
FIG. 6 is a schematic view showing a method for measuring a shaft torque.

FIG. 6 shows a method for measuring the shaft torque. A jig M1 is fixed in a width of 40 mm from the tip end Tp. The fixation is achieved by an air chuck, and the air pressure of the air chuck is 2.0 kgf/cm$^2$. A jig M2 is fixed in a width of 50 mm from a position separated by 750 mm from the jig M1. The fixation is achieved by an air chuck, and the air pressure of the air chuck is 1.5 kgf/cm$^2$. A torque Tr of 13.9 kg-cm is applied to the shaft sf by rotating the jig M2 while fixing the jig M1. A torsional angle due to the torque is the shaft torque.

[8. Examples of Utilizable Prepregs]

The following tables 1 and 2 show examples of utilizable prepregs for the shafts of the present disclosure.

TABLE 1

| | | | | | | Physical property value of reinforcement fiber | |
|---|---|---|---|---|---|---|---|
| Manufacturer | Trade name | Thickness of sheet (mm) | Fiber content (% by weight) | Resin content (% by weight) | Part number of fiber | Tensile elastic modulus (t/mm$^2$) | Tensile strength (kgf/mm$^2$) |
| Toray Industries, Inc. | 3255S-10 | 0.082 | 76 | 24 | T700S | 24 | 500 |
| Toray Industries, Inc. | 3255S-12 | 0.103 | 76 | 24 | T700S | 24 | 500 |
| Toray Industries, Inc. | 3255S-15 | 0.123 | 76 | 24 | T700S | 24 | 500 |

TABLE 1-continued

Examples of utilizable prepregs

| Manufacturer | Trade name | Thickness of sheet (mm) | Fiber content (% by weight) | Resin content (% by weight) | Part number of fiber | Physical property value of reinforcement fiber | |
|---|---|---|---|---|---|---|---|
| | | | | | | Tensile elastic modulus (t/mm$^2$) | Tensile strength (kgf/mm$^2$) |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Toray Industries, Inc. | 2276S-10 | 0.077 | 80 | 20 | T800S | 30 | 600 |
| Toray Industries, Inc. | 805S-3 | 0.034 | 60 | 40 | M30S | 30 | 560 |
| Toray Industries, Inc. | 8053S-3 | 0.028 | 70 | 30 | M30S | 30 | 560 |
| Toray Industries, Inc. | 9255S-7A | 0.056 | 78 | 22 | M40S | 40 | 470 |
| Toray Industries, Inc. | 9255S-6A | 0.047 | 76 | 24 | M40S | 40 | 470 |
| Toray Industries, Inc. | 925AS-4C | 0.038 | 65 | 35 | M40S | 40 | 470 |
| Toray Industries, Inc. | 9053S-4 | 0.027 | 70 | 30 | M40S | 40 | 470 |
| Nippon Graphite Fiber Co., Ltd. | E1026A-09N | 0.100 | 63 | 37 | XN-10 | 10 | 190 |
| Nippon Graphite Fiber Co., Ltd. | E1026A-14N | 0.150 | 63 | 37 | XN-10 | 10 | 190 |

The tensile strength and the tensile elastic modulus are measured in accordance with "Testing Method for Carbon Fibers" JIS R7601: 1986.

TABLE 2

Examples of utilizable prepregs

| Manufacturer | Trade name | Thickness of sheet (mm) | Fiber content (% by weight) | Resin content (% by weight) | Part number of fiber | Physical property value of reinforcement fiber | |
|---|---|---|---|---|---|---|---|
| | | | | | | Tensile elastic modulus (t/mm$^2$) | Tensile strength (kgf/mm$^2$) |
| Mitsubishi Rayon Co., Ltd. | GE352H-160S | 0.150 | 65 | 35 | E glass | 7 | 320 |
| Mitsubishi Rayon Co., Ltd. | TR350C-100S | 0.083 | 75 | 25 | TR50S | 24 | 500 |
| Mitsubishi Rayon Co., Ltd. | TR350U-100S | 0.078 | 75 | 25 | TR50S | 24 | 500 |
| Mitsubishi Rayon Co., Ltd. | TR350C-125S | 0.104 | 75 | 25 | TR50S | 24 | 500 |
| Mitsubishi Rayon Co., Ltd. | TR350C-150S | 0.124 | 75 | 25 | TR50S | 24 | 500 |

TABLE 2-continued

Examples of utilizable prepregs

|  |  |  |  |  | Physical property value of reinforcement fiber | |
|---|---|---|---|---|---|---|
| Manufacturer | Trade name | Thickness of sheet (mm) | Fiber content (% by weight) | Resin content (% by weight) | Part number of fiber | Tensile elastic modulus (t/mm$^2$) | Tensile strength (kgf/mm$^2$) |
| Mitsubishi Rayon Co., Ltd. | TR350C-175S | 0.147 | 75 | 25 | TR50S | 24 | 500 |
| Mitsubishi Rayon Co., Ltd. | MR350J-025S | 0.034 | 63 | 37 | MR40 | 30 | 450 |
| Mitsubishi Rayon Co., Ltd. | MR350J-050S | 0.058 | 63 | 37 | MR40 | 30 | 450 |
| Mitsubishi Rayon Co., Ltd. | MR350C-050S | 0.05 | 75 | 25 | MR40 | 30 | 450 |
| Mitsubishi Rayon Co., Ltd. | MR350C-075S | 0.063 | 75 | 25 | MR40 | 30 | 450 |
| Mitsubishi Rayon Co., Ltd. | MRX350C-075R | 0.063 | 75 | 25 | MR40 | 30 | 450 |
| Mitsubishi Rayon Co., Ltd. | MRX350C-100S | 0.085 | 75 | 25 | MR40 | 30 | 450 |
| Mitsubishi Rayon Co., Ltd. | MR350C-100S | 0.085 | 75 | 25 | MR40 | 30 | 450 |
| Mitsubishi Rayon Co., Ltd. | MRX350C-125S | 0.105 | 75 | 25 | MR40 | 30 | 450 |
| Mitsubishi Rayon Co., Ltd. | MR350C-125S | 0.105 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | HRX350C-110S | 0.082 | 75 | 25 | HR40 | 40 | 450 |

The tensile strength and the tensile elastic modulus are measured in accordance with "Testing Method for Carbon Fibers" JIS R7601: 1986.

EXAMPLES

Hereinafter, the effects of the present disclosure will be clarified by examples. However, the present disclosure should not be interpreted in a limited way based on the description of examples.

Example 1

A first shaft (for a 4-iron), a second shaft (for a 7-iron), and a third shaft (for a pitching wedge) were produced by the above-described processes. The first shaft was produced with the constitution of FIG. 3. The second shaft was produced with the constitution of FIG. 4. The third shaft was produced with the constitution of FIG. 5. The above-described variation A (Wa1<Wa2<Wa3), variation B (Wb1<Wb2<Wb3), and variation C (Wc1> Wc2>Wc3) were adopted. Each butt partial straight layer s5 and each tip partial straight layer s9 were glass fiber reinforced layers.

As to the variation A, the prepreg weight per unit area of the butt partial bias layers s3 and s4 of the second shaft was greater than the prepreg weight per unit area of the butt partial bias layers s3 and s4 of the first shaft. The length La in the third shaft was longer than the length La in the second shaft (see FIGS. 4 and 5). The kinds of fibers and fiber contents for the respective butt partial bias layers of the first shaft, the second shaft and the third shaft were the same.

As to the variation B, the length Lb in the second shaft was longer than the length Lb in the first shaft, and the length Lb in the third shaft was longer than the length Lb in the second shaft (see FIGS. 3 to 5). The kinds of fibers and fiber contents for the respective butt partial straight layers of the first shaft, the second shaft and the third shaft were the same.

As to the variation C, the length Lc in the second shaft was shorter than the length Lc in the first shaft.

The tip partial bias layer was not provided in the third shaft (see FIGS. 3 to 5). The kinds of fibers and fiber contents for the respective tip partial bias layers of the first shaft and the second shaft were the same.

The weight Wd of the full length bias layer was constant. For this reason, the tip end width Ht of the full length bias layer was varied. The tip end width Ht in the second shaft was greater than the tip end width Ht in the first shaft. The tip end width Ht in the third shaft was greater than the tip end width Ht in the second shaft (see FIGS. 3 to 5).

A grip and a 4-iron head were attached to the obtained first shaft. A grip and a 7-iron head were attached to the obtained second shaft. A grip and a pitching-wedge head were attached to the obtained third shaft. Thus, a club set according to Example 1 was obtained. Specifications and results of evaluations of Example 1 are shown in below Table 3.

Example 2

The variation B was not adopted. That is, the length Lb in each butt partial straight layer s5 was constant, and thus the weight Wb was constant (Wb1=Wb2=Wb3). Except for this, a club set of Example 2 was obtained in the same manner as in Example 1. Specifications and results of evaluations of Example 2 are shown in below Table 4.

Comparative Example

The variation A and the variation C were not adopted. That is, the dimensions and the kinds of prepregs of the butt partial bias layers s3 and s4 were constant, and thus the weight Wa was constant (Wa1=Wa2=Wa3). The laminated constitution of the third shaft was the same as those of the first shaft and the second shaft, the dimensions and the kinds of prepregs of the tip partial bias layers s10 and s11 were constant, and thus the weight Wc was constant (Wc1=Wc2=Wc3). Except for this, a club set of Comparative Example was obtained in the same manner as in Example 1. Specifications and results of evaluations of Comparative Example are shown in below Table 5.

TABLE 3

Specifications and results of evaluations for Example 1

|  | Unit | First Shaft | Second Shaft | Third Shaft |
|---|---|---|---|---|
| Club Number | — | 4-iron | 7-iron | Pitching Wedge |
| Shaft Length Ls | mm | 961 | 921 | 879 |
| Shaft Weight | gram | 51.6 | 51.0 | 51.4 |
| Shaft Torque | degree | 3.8 | 3.7 | 3.7 |
| Variation (Variation A) in Weight Wa of Butt Partial Bias Layer | — | Applied Wa1 < Wa2 < Wa3 | | |
| Variation (Variation B) in Weight Wb of Butt Partial Straight Layer | — | Applied Wb1 < Wb2 < Wb3 | | |
| Variation (Variation C) in Weight Wc of Tip Partial Bias Layer | — | Applied Wc1 > Wc2 > Wc3 | | |
| Uniformity of Shaft Feelings | Score | 4.8 | | |

TABLE 4

Specifications and results of evaluations for Example 2

|  | Unit | First Shaft | Second Shaft | Third Shaft |
|---|---|---|---|---|
| Club Number | — | 4-iron | 7-iron | Pitching Wedge |
| Shaft Length Ls | mm | 961 | 921 | 879 |
| Shaft Weight | gram | 51.6 | 51.3 | 51.0 |
| Shaft Torque | degree | 3.8 | 3.7 | 3.7 |
| Variation (Variation A) in Weight Wa of Butt Partial Bias Layer | — | Applied Wa1 < Wa2 < Wa3 | | |
| Variation (Variation B) in Weight Wb of Butt Partial Straight Layer | — | Not Applied Wb1 = Wb2 = Wb3 | | |
| Variation (Variation C) in Weight Wc of Tip Partial Bias Layer | — | Applied Wc1 > Wc2 > Wc3 | | |
| Uniformity of Shaft Feelings | Score | 4.1 | | |

TABLE 5

Specifications and results of evaluations for Comparative Example

|  | Unit | First Shaft | Second Shaft | Third Shaft |
|---|---|---|---|---|
| Club Number | — | 4-iron | 7-iron | Pitching Wedge |
| Shaft Length Ls | mm | 961 | 921 | 879 |
| Shaft Weight | gram | 51.5 | 51.8 | 51.9 |
| Shaft Torque | degree | 4.0 | 3.8 | 3.5 |
| Variation (Variation A) in Weight Wa of Butt Partial Bias Layer | — | Not Applied Wa1 = Wa2 = Wa3 | | |
| Variation (Variation B) in Weight Wb of Butt Partial Straight Layer | — | Applied Wb1 < Wb2 < Wb3 | | |
| Variation (Variation C) in Weight Wc of Tip Partial Bias Layer | — | Not Applied Wc1 = Wc2 = Wc3 | | |
| Uniformity of Shaft Feelings | Score | 2.4 | | |

The evaluation methods are as follows.

[Uniformity of Shaft Feelings]

Ten testers performed ball-hitting tests. As for shaft feeling, sensuous evaluations were made. Uniformities of shaft feelings in the sets were evaluated. The evaluations were made on a scale of one to five. The higher the score is, the higher the uniformity of shaft feelings is. The lower the score is, the greater the differences of shaft feelings in the set are. The average scores of the ten testers are shown in the above Tables 3 to 5.

As shown in Table 3 to Table 5, Examples are highly evaluated as compared with Comparative Example. From the results of evaluations, the advantages of the present disclosure are apparent.

The present disclosure can be applied to all types of golf club sets such as a wood type golf club set, a hybrid type golf club set, and an iron type golf club set.

The description hereinabove is merely for an illustrative example, and various modifications can be made in the scope not to depart from the principles of the present disclosure.

What is claimed is:

1. A shaft set for a golf club set, comprising:
a first shaft;
a second shaft shorter than the first shaft; and
a third shaft shorter than the second shaft, wherein
each of the first shaft, the second shaft and the third shaft includes a full length bias layer,
at least the second shaft and the third shaft each include a butt partial bias layer, and a weight of the butt partial bias layer is increased as the shaft is shortened in comparison among the first, the second and the third shafts,
at least the first shaft and the second shaft each include a tip partial bias layer, and a weight of the tip partial bias layer is decreased as the shaft is shortened in comparison among the first, the second and the third shafts,
the first shaft, the second shaft, and the third shaft have respective shaft weights of less than 60 g, and have respective shaft torques of less than 4 degrees,
a maximum value of the shaft weights is less than or equal to 1.10 times a minimum value of the shaft weights in comparison among the first, the second, and the third shafts,
the first shaft has a length of longer than or equal to 928 mm and shorter than or equal to 991 mm,
the second shaft has a length of longer than or equal to 885 mm and shorter than 928 mm,
the third shaft has a length of longer than or equal to 860 mm and shorter than 885 mm,
the full length bias layer has a tip end width Ht, and the tip end width Ht is increased as the shaft is shortened in comparison among the first, the second, and the third shafts.

2. The shaft set according to claim 1, wherein
at least the second shaft and the third shaft each include a butt partial straight layer, and a weight of the butt partial straight layer is increased as the shaft is shortened.

3. The shaft set according to claim 2, wherein
the butt partial straight layer includes a glass fiber reinforced layer, and
a weight of the glass fiber reinforced layer is increased as the shaft is shortened.

4. The shaft set according to claim 1, wherein a maximum value of a weight of the full length bias layer is less than or equal to 1.10 times a minimum value of a weight of the full length bias layer in comparison among the first, the second and the third shafts.

5. The shaft set according to claim 1, wherein the first shaft does not include the butt partial bias layer.

6. The shaft set according to claim 1, wherein the third shaft does not include the tip partial bias layer.

7. The shaft set according to claim 2, wherein each of the first shaft, the second shaft, and the third shaft includes the butt partial straight layer, and the weight of the butt partial straight layer is increased as the shaft is shortened.

8. The shaft set according to claim 1, wherein the maximum value of the shaft weights is less than or equal to 1.05 times the minimum value of the shaft weights in comparison among the first, the second, and the third shafts.

9. The shaft set according to claim 1, wherein
the full length bias layer has a butt end width Hb, and
a ratio (Ht/Hb) is increased as the shaft is shortened in comparison among the first, the second, and the third shafts.

10. An iron type golf club set using the shaft set according to claim 1, comprising:
a first golf club to which the first shaft is attached;
a second golf club to which the second shaft is attached; and
a third golf club to which the third shaft is attached, wherein
the first golf club has a loft angle of greater than or equal to 15 degrees and less than or equal to 28 degrees,
the second golf club has a loft angle of greater than 28 degrees and less than or equal to 42 degrees, and
the third golf club has a loft angle of greater than 42 degrees.

11. The iron type golf club set according to claim 10, wherein
the first golf club is a 5-iron,
the second golf club is a 6-iron, a 7-iron, an 8-iron, or a 9-iron, and
the third golf club is a pitching wedge.

* * * * *